March 5, 1963 A. ADKINS 3,079,655
CAST WELDING MOLD APPARATUS
Filed Dec. 27, 1960

INVENTOR.
ALLEN ADKINS
BY
ATTORNEY

United States Patent Office 3,079,655
Patented Mar. 5, 1963

3,079,655
CAST WELDING MOLD APPARATUS
Allen Adkins, Rowayton, Conn., assignor to Burndy
Corporation, a corporation of New York
Filed Dec. 27, 1960, Ser. No. 78,468
7 Claims. (Cl. 22—116)

This invention relates to cast welding apparatus and, more particularly, to a portable mold for use with cast welding involving an exothermic reaction.

Cast welding involving an exothermic reaction is well known. Generally, the mold is made in several parts of graphite and a charge which may contain copper oxide and a copper aluminum alloy is introduced into the mold and ignited. This process has been used, for example, to join a copper conductor to a steel rail. The graphite blocks are simply clamped to the rail, a charge introduced together with an ignition powder and a spark applied. As the exothermic reaction occurs, the mold becomes quite warm, and flames may be visible.

The process has of late been applied to welding heavy electrical conductors. The graphite molds are smaller and are supplied with removable handles to permit replacement of deteriorated molds. The molds, however, may still become too hot to handle conveniently, and although a cover may be placed on top of the mold to deflect the flame, the flame may be disconcerting.

It is, therefore, an object of this invention to provide a cast welding apparatus which is light-weight, and sufficiently cool at its exterior surfaces to be conveniently handled.

Another object is to provide a cast welding apparatus which minimizes the flame and smoke resulting from the welding operation.

Still another object is to provide a cast welding apparatus which may be conveniently ignited by means fixedly secured thereto.

A feature of this invention is a mold which is removably mounted in a spaced-away, heat shielding, housing.

Another feature of this invention is a flame and smoke baffle which is mounted on top of the mold to minimize the exhaust products of the reaction.

Yet another feature of this invention is a baffle and housing arrangement which discharges the reaction exhaust products from the bottom of the apparatus.

These and other objects and features of this invention will become more apparent by reference to the following description taken in conjunction with the accompanying drawings, in which.

Figure 1:
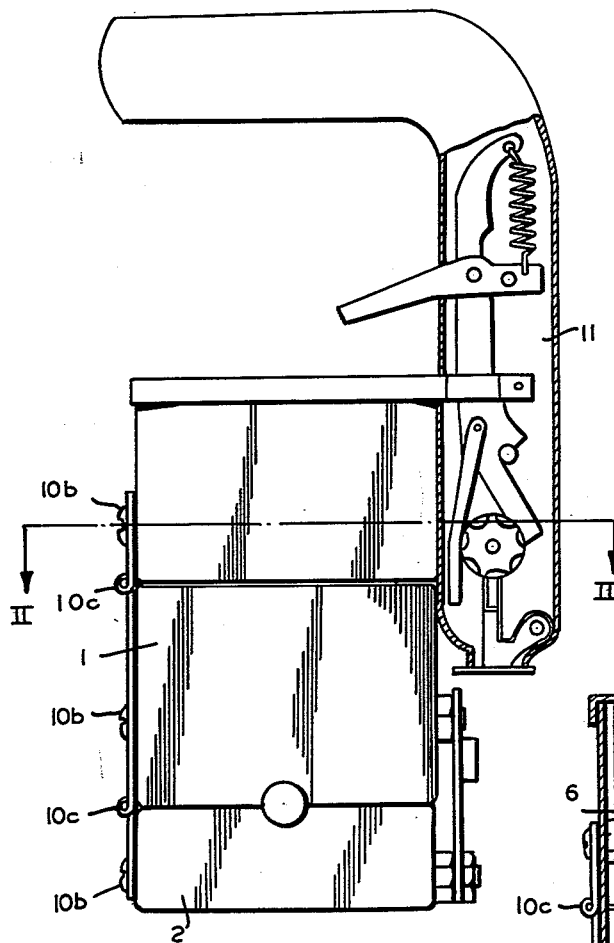
FIG. 1 is a side view of the invention showing the housing and flint gun.
Figure 2:
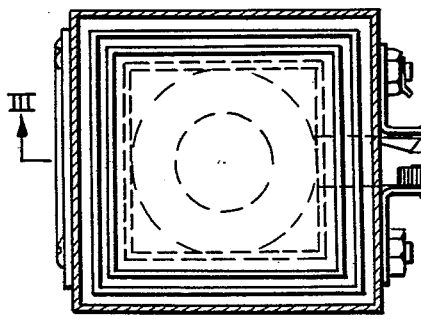
FIG. 2 is a view in section taken along line 2—2 of FIG. 1.
Figure 3:
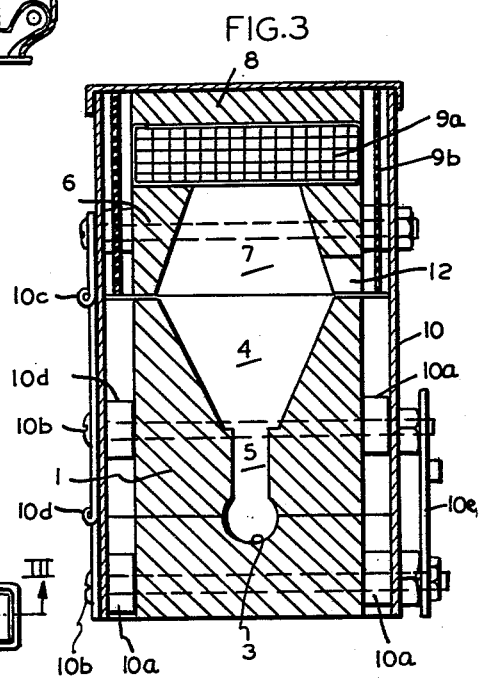
FIG. 3 is a view in section taken along line 3—3 of FIG. 2.

As shown in FIGS. 1 and 2, the exemplary apparatus of this invention includes a graphite mold which has an upper part 1 and a lower part 2. Formed between parts 1 and 2 is a cavity 3 adapted to receive the conductors (not shown) to be welded. Upper part 1 also includes a crucible portion 4 into which a suitable welding powder and ignition powder (not shown) may be placed. A sprue 5 connects the crucible 4 with the cavity 3.

A graphite cover 6 is disposed on top of crucible 4. Cover 6 has a central hole 7 having a truncated cone shaped cross-section. Spaced above the cover 6 is a graphite top or deflection plate 8. A perforated screen or plate which may be formed of several layers of wire mesh 9a and 9b is disposed between and around the cover 6 and top plate 8, peripherally to the hole 7.

The several graphite parts 2, 1, 6, and 8, may be mounted in a suitable metal housing 10. The housing 10 may be spaced away from the graphite parts by means of insulated bushings 10a; and may be secured to the graphite parts by suitable means, such as bolts 10b. The housing may be made in several hinged-together sections as at 10c and 10d to permit access to the graphite parts. Pivotal catches, as at 10e, may also be provided to secure the hinged section together.

A suitable ignition source, such as a flint gun 11, together with a suitable access passage 12, for the spark through the housing, and cover 6 is also provided. The gun may be permanently secured to the housing, and serve as a handle therefor.

In use the conductors are inserted into the cavity 3; a fusible disk (not shown) is placed in top of the sprue 5; the welding powder and then the ignition powder are poured into the crucible 4; and the gun 11 is fired. The spark ignites the ignition powder which ignites the welding powder producing an exothermic reaction. The resultant gases and flames are diverted by the inwardly-upwardly sloping walls of the cover 6 to strike the top plate 8, onto which is deposited most of the large particles from the welding mixture. The more minute particles flow through the wire screen 9 and collect on its strands. The screen 9 is not in the direct flow of the flame and is not affected by the heat therefrom. The residuary smoke passes between the graphite parts and the housing and is exhausted at the bottom of the assembly. The customary flame is substantially contained within the assembly and is not obvious to the operator, while the smoke is significantly reduced in density.

The invention has thus been described, but it is desired to be understood that it is not confined to the particular forms or usages shown and described, the same being merely illustrative, and that the invention may be carried out in other ways without departing from the spirit of the invention and, therefore, the right is broadly claimed to employ all equivalent instrumentalities coming within the scope of the appendent claims, and by means of which objects of this invention are attained and new results accomplished, as it is obvious that the particular embodiments herein shown and described are only some of the many that can be employed to obtain these objects and accomplish these results.

I claim:

1. A cast welding mold assembly comprising: a mold including a crucible portion, a sprue portion and a portion adapted to receive the article to be welded; a gas and smoke exhaust passage means passing through said mold; a perforated screen obstructing said gas passage, and an ignition passage means passing through said mold.

2. The assembly of claim 1, wherein said mold is disposed within a housing and spaced therefrom.

3. The assembly of claim 2, wherein a deflection plate is disposed within said gas passage means.

4. The assembly of claim 3, wherein said deflection plate is disposed above and spaced from said crucible.

5. The assembly of claim 4, wherein said gas passage means is provided by said sprue portion, said crucible portion, said deflection plate, and the space between said mold and said housing; said gas passage means being adapted to pass the gas exhaust up from and out of the mold, and down and around said mold, and out of the assembly.

6. The assembly of claim 2, wherein said ignition passage means passes through said housing and said mold to said crucible.

7. The assembly of claim 6, wherein said mold is removably mounted in said housing and said deflection plate is hinged to said housing.

References Cited in the file of this patent

UNITED STATES PATENTS 1,168,061  Deppeler _____ Jan. 11, 1916

FOREIGN PATENTS 469,352  Germany _____ Dec. 10, 1928